United States Patent
Umkehrer

(10) Patent No.: US 8,043,001 B2
(45) Date of Patent: Oct. 25, 2011

(54) APPARATUS AND METHOD FOR DETERMINING AND/OR MONITORING TEMPERATURE

(75) Inventor: Alfred Umkehrer, Hopferau (DE)

(73) Assignee: Endress + Hauser Wetzer GmbH Co. KG, Nesselwang (DE)

( * ) Notice: Subject to any disclaimer, the term of this patent is extended or adjusted under 35 U.S.C. 154(b) by 517 days.

(21) Appl. No.: 11/921,852

(22) PCT Filed: Jun. 8, 2006

(86) PCT No.: PCT/EP2006/062991
§ 371 (c)(1),
(2), (4) Date: Mar. 26, 2009

(87) PCT Pub. No.: WO2006/136496
PCT Pub. Date: Dec. 28, 2006

(65) Prior Publication Data
US 2010/0061422 A1 Mar. 11, 2010

(30) Foreign Application Priority Data
Jun. 21, 2005 (DE) .......................... 10 2005 029 045

(51) Int. Cl.
*G01K 7/20* (2006.01)
(52) U.S. Cl. ....................................... 374/185; 374/141
(58) Field of Classification Search .................. 33/141, 33/163, 170, 183, 185; 702/130–136
See application file for complete search history.

(56) References Cited

U.S. PATENT DOCUMENTS

| | | | |
|---|---|---|---|
| 4,377,346 A * | 3/1983 | Beaver et al. ..................... | 374/1 |
| 5,140,302 A * | 8/1992 | Hara et al. ..................... | 340/449 |
| 5,317,520 A | 5/1994 | Castle | |
| 6,890,097 B2 * | 5/2005 | Tanaka ........................... | 374/185 |
| 7,237,952 B2 * | 7/2007 | Ishihara et al. ................ | 374/185 |

(Continued)

FOREIGN PATENT DOCUMENTS

| DE | 25 26 027 A1 | 12/1976 |
|---|---|---|
| DE | 39 33 311 A1 | 4/1991 |
| WO | WO 99/05480 | 2/1999 |

OTHER PUBLICATIONS

Eckl, Rainer: Einfacher denn je: Erfassen, Messen und Verarbeiten von Temperature. In: Elektronikpyrsis, 1980, pp. 23-29.
Peisker, Von Peter: A/D-Umsetzer vereinfacht Thermometer-Design. In: Elektronik, 2001, pp. 98-102.

*Primary Examiner* — Brad Bennett
(74) *Attorney, Agent, or Firm* — Bacon & Thomas, PLLC

(57) ABSTRACT

An apparatus and method for determining and/or monitoring at least one temperature, the apparatus including: a first and a second temperature sensor; a measurement transmitter; wherein the measurement transmitter has four terminals for electrical connection of electric lines; and five electric lines. The first temperature sensor is connected with three terminals of the measurement transmitter via three electric lines the three electric lines are connected with the first temperature sensor and with the measurement transmitter in such a manner that, via a 3-line circuit, a value of the electric resistance of at least one of the three lines can be obtained; and the second temperature sensor is connected with two terminals of the measurement transmitter via two electric lines. The value of the electrical resistance of the at least one electric line obtained via the 3-line circuit serves for determining the value of the electrical resistance of at least one electric line, via which the second temperature sensor is connected with the measurement transmitter.

10 Claims, 2 Drawing Sheets

U.S. PATENT DOCUMENTS 7,497,615 B2* 3/2009 Kim et al. .................... 374/170
2004/0125856 A1* 7/2004 Sprock et al. ................ 374/183
2004/0125857 A1* 7/2004 Sprock et al. ................ 374/185
2011/0158288 A1* 6/2011 Huang et al. ................ 374/185

* cited by examiner

APPARATUS AND METHOD FOR DETERMINING AND/OR MONITORING TEMPERATURE

TECHNICAL FIELD

The invention relates to an apparatus for determining and/or monitoring at least one temperature. The apparatus includes: at least a first temperature sensor and a second temperature sensor; at least one measurement transmitter; wherein the measurement transmitter has at least four terminals for electrical connection of electric lines to the measurement transmitter; and at least five electric lines. The first temperature sensor is connected via at least three electric lines with at least three terminals of the measurement transmitter the three electric lines are connected in such a manner with the first temperature sensor and the measurement transmitter that, via a three-line circuit, a value of the electrical resistance of at least one of the three lines can be obtained, and the second temperature sensor is connected via at least two electric lines with at least two terminals of the measurement transmitter.

Additionally, the invention relates to a method for determining and/or monitoring at least one temperature, wherein the temperature-dependent electrical resistance of at least a first temperature sensor and a second temperature sensor is evaluated The first temperature sensor and the second temperature sensor are connected with a measurement transmitter via electric lines. The temperature can be, for example, the temperature in a space or the temperature in a container, or the temperature of a medium.

BACKGROUND DISCUSSION

In the state of the art, it is known to measure a temperature via a resistance element, whose electrical resistance depends on the temperature existing in its surroundings. The resistance element forms, thus, the temperature sensor of a resistance thermometer. In order, in the case of such measuring devices, to determine, sufficiently exactly, the resistance of the temperature sensor and, therewith, temperature, a hookup of the sensor with at least three electric lines/connections is necessary. In the case of such a 3-wire circuit, it is assumed that the electrical resistances of all 3 lines are equal, i.e. equal line lengths and equal temperature of the connection wires is assumed. By measuring the resistance of the lines located on the same side of the resistance element, the line resistance can be determined. This line resistance is then subtracted from the measured total resistance through the lines lying opposite one another on the resistance element, in order to determine the resistance of the sensor itself. This continual measurement of the electrical resistance of the connecting lines is important, since the resistance value of the lines is likewise temperature dependent.

The electrical connecting lines are usually connected to a measurement transmitter, which operates the temperature sensor suitably and evaluates or conditions the measured values, or transmits the measured values to a display unit or via a databus to a superordinated unit. Such a temperature head transmitter for installation in a connection head of the Form B according to DIN 43729 has usually 6 connection terminals: One terminal each for the current supply and the output signal produced by the transmitter and four terminals for connection of the sensor. There are, however, some applications, in which two sensors are connected, e.g. two thermocouples or two resistance thermometers. For the measuring of two resistance sensors (e.g. resistance thermometers or resistance-dependent position transducers) in, in each case, a 3-line circuit, at least 5 terminals are required. One terminal is, in such case, connected simultaneously with two connecting wires. The placement of a fifth sensor terminal on a DIN B head transmitter is very difficult, since, on the one hand, the terminals become too small for manual working, or less space remains for a parametering interface and lateral cable lead-in for power supply/signal. The problem increases in the case of head transmitters with 4 terminals, in which case, the only possibility offered is for simultaneous connection of one 3- and one 2-wire resistance sensor. This leads to extreme inaccuracies in the case of the 2-line resistance sensor, since, for this, no information is present concerning the temperature-dependent resistance of the connecting lines.

SUMMARY OF THE INVENTION

An object of the invention is to provide a temperature measuring device having two temperature sensors, which permit, in each case, a temperature measurement which is as accurate as possible, such being coupled with low apparatus complexity.

The invention achieves the object with an apparatus for determining and/or monitoring at least one temperature, the apparatus including: at least a first temperature sensor and a second temperature sensor; at least one measurement transmitter; wherein the measurement transmitter has at least four terminals for electrical connection of electric lines to the measurement transmitter; and at least five electric lines. The first temperature sensor is connected with at least three terminals of the measurement transmitter via at least three electric lines the three electric lines are connected with the first temperature sensor and with the measurement transmitter in such a manner that, via a 3-line circuit, a value of the electrical resistance of at least one of the three electric lines can be obtained; and the second temperature sensor is connected with at least two terminals of the measurement transmitter via at least two electric lines.

The apparatus of the invention provides, for achieving the object, that the value of the electrical resistance of the at least one electric line obtained via the 3-line circuit serves for determining the value of the electrical resistance of at least one electric line, via which the second temperature sensor is connected with the measurement transmitter. The invention rests, thus, therein, that both temperature sensors are connected to a measurement transmitter, with the resistance value determined for the connecting lines of the first temperature sensor being used also for determining the resistance of the connecting lines of the second temperature sensor. An embodiment provides, especially, that the first temperature sensor is connected with the measurement transmitter via only 3 lines, and that the second temperature sensor is connected with the measurement transmitter via only 2 lines. This is, thus, the minimum number of lines, with which two temperature sensors can be connected to a measurement transmitter. In such case, the invention enables accurate temperature measurement also with the second temperature sensor, in that the values determined for the first temperature sensor are used also for the second sensor. The invention allows, thus, temperature to be measured very accurately with each of two temperature sensors, with a 3-line connection not being required for both temperature sensors. Thus, fewer lines are required, fewer terminals, and less operating circuitry. It is, in principle, possible to measure with the measuring apparatus at least a first and a second temperature (corresponding to the two temperature sensors) or one temperature two times and, thus, redundantly.

An embodiment of the apparatus of the invention includes that at least one microprocessor is provided for controlling the terminals and/or for evaluating and/or monitoring the at least one temperature via the first temperature sensor and/or the second temperature sensor. Two temperature sensor permit a redundant measurement, or monitoring, of one temperature or the measurement of two different temperatures reigning at the locations of the two temperature sensors.

An embodiment of the apparatus of the invention provides that the microprocessor is embodied in such a way that it uses the value of the electrical resistance determined with the 3-line circuit for calculating the value of the electrical resistance of the electric lines, via which the second temperature sensor is connected with the measurement transmitter. The controlling microprocessor, or microcontroller, is thus embodied in such a manner that it uses the resistance value determined for the connecting lines of the first temperature sensor also for determining the resistance value of the connecting lines of the second temperature sensor.

An embodiment of the apparatus of the invention includes that the five electric lines are arranged in such a manner that essentially the same temperature acts on them. The five connecting lines are preferably embodied and arranged in such a manner that essentially the same temperature acts on each of them. An embodiment of the apparatus of the invention associated therewith includes that the electric lines are arranged in at least one protective tube. The lines thus lie as close as possible to one another.

An embodiment of the apparatus of the invention provides that at least two of the electrical resistances of the five electric lines have a known relationship to one another. If the relationship of the resistance values is known, then, on the basis of that relationship, measurement of one value in a corresponding circuit makes possible the determination, or calculation, of the other value. For the 3-line circuit, for example, it is assumed, in general, that all three lines have the same resistance. However, also other relationships can be used, it being likewise necessary that they be known, in each case, for the calculation. This embodiment thus draws both on known relationships of the resistance values to one another within the lines of one temperature sensor, as well as on the relationships of the resistances between the lines of the separate temperature sensors. The known relationships can be produced, for example, by corresponding embodying of the lines.

An embodiment of the apparatus of the invention includes that the electrical resistances of the three electric lines of the first temperature sensor and the electrical resistances of the two electric lines of the second temperature sensor have a known relationship to one another. If the relationship of the resistance values to one another is known, then, thereby, via the value determined with the 3-line circuit, the resistance value of the two other electric lines can be determined, or, especially, calculated.

An embodiment of the apparatus of the invention provides that the five electric lines are caused to have essentially the same electrical resistance. In this embodiment, the value determined with the 3-line connection can then be used directly for evaluating the measured value of the second temperature sensor. Preferably, the five lines are thus of the same material, have equal lengths, and are arranged as much as possible all in the same location, i.e. near to one another.

An embodiment of the apparatus of the invention provides that at least the first temperature sensor is a temperature measuring resistor.

An embodiment of the apparatus of the invention includes that at least one electric line of the three electric lines, via which the first temperature sensor is connected to the measurement transmitter, and at least one electric line of the two electric lines, via which the second temperature sensor is connected with the measurement transmitter, are connected to the same terminal of the measurement transmitter. This embodiment provides that, quasi, both temperature sensors are connected with the measurement transmitter via at least one common terminal. Consequently, only four terminals are required for the five electric lines, with, nevertheless, a very accurate temperature measurement with two temperature sensors being possible by way of the invention.

The invention also achieves the noted object with a method for determining and/or monitoring at least one temperature, wherein the temperature-dependent electrical resistance of at least a first temperature sensor and a second temperature is evaluated, and wherein the first temperature sensor and the second temperature sensor are connected with a measurement transmitter via electric lines.

The method of the invention provides that, via the first temperature sensor, the value of the electrical resistance of the electric lines connected with the first temperature sensor is determined, and that the determined value of the electrical resistance is applied for determining the values of the electrical resistance of the electric lines connected with the second temperature sensor. The invention resides, thus, therein, that the electrical resistance value of the lines of one temperature sensor is determined, i.e. measured. This resistance value is then applied for determining the resistance value of the lines of the second temperature sensor. The embodiments described above for the apparatus hold correspondingly for the method. Especially, it is, thus, also advantageous in the case of the method, when the relationships of the resistance values to one another are known.

The invention will now be explained in greater detail on the basis of the appended drawings, the figures of which show as follows:

DETAILED DESCRIPTION

Figure 1:
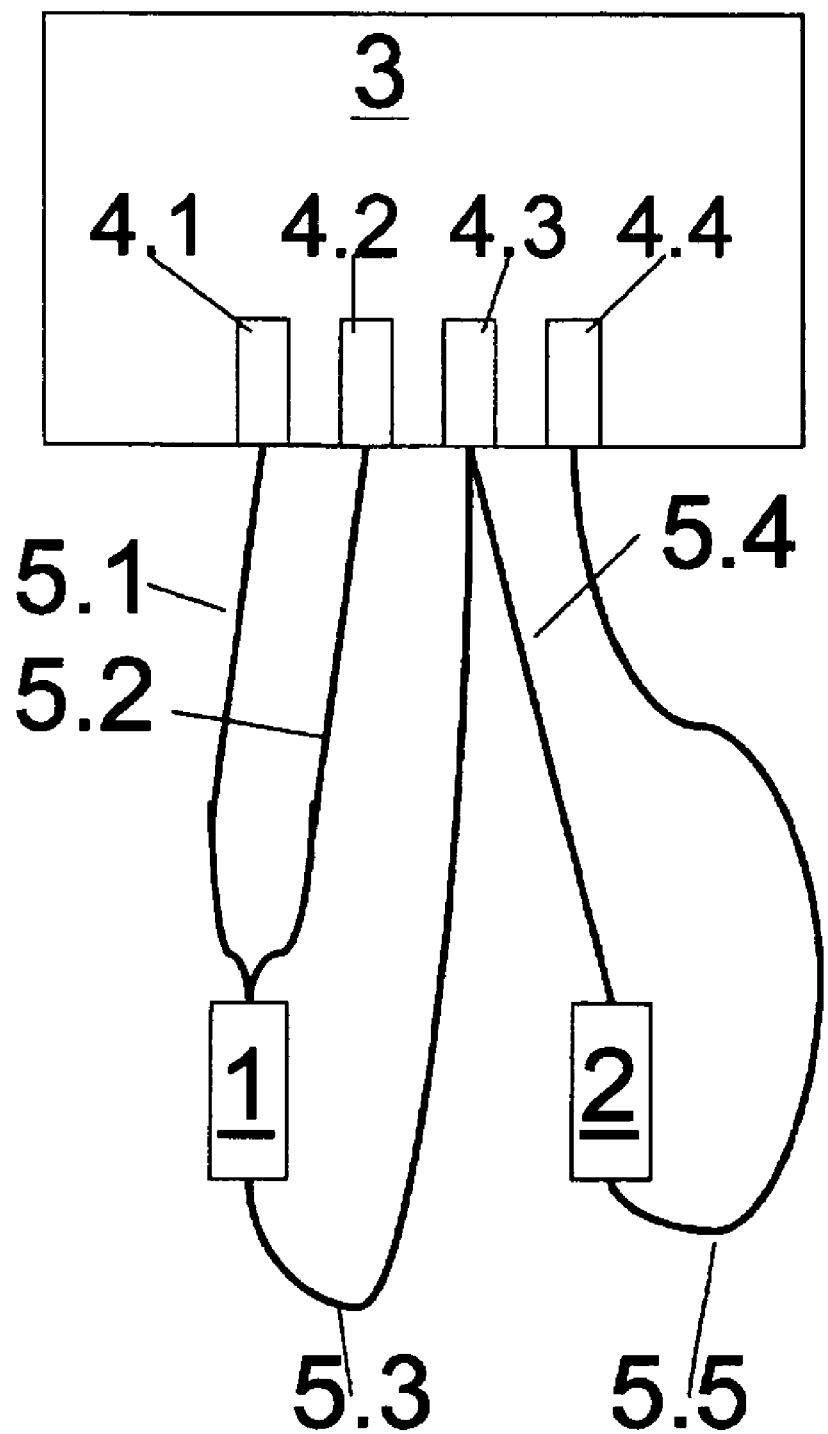
FIG. 1 is a schematic drawing of the circuitry of the apparatus of the invention.

FIG. 1 shows, schematically, the apparatus of the invention for measuring and/or monitoring at least one temperature. The temperature measurement is performed here with two temperature sensors 1, 2, with each being a temperature measurement resistor. I.e. used for temperature measurement is the fact that the electrical resistance depends on temperature. The first temperature sensor 1 is connected via three lines, or wires, 5.1, 5.2, 5.3 with three terminals 4.1, 4.2, 4.3. The measurement transmitter 3 measures, for example, resistance resulting from the three lines 5.1, 5.2, 5.3 and the temperature measurement resistor 1 and determines therefrom the temperature, or determines, in the case of a change of the resistance value, that the temperature has changed.

Problematic is that also the resistance values of the lines required for connection change with temperature. Therefore, the first temperature sensor 1 is connected with the measurement transmitter via three lines 5.1, 5.2, 5.3 in a so-called 3-wire circuit. If the electrical resistance between the terminals 4.1 and 4.3, respectively between the terminals 4.2 and 4.3, is measured, there can be obtained from these measurements the electrical resistance of the lines 5.1 and 5.2, which form, quasi, the doubled connection between sensor 1 and measurement transmitter 3. In such case, it is assumed that these two lines 5.1 and 5.2 have the same electrical resistance. If it is additionally assumed that also the third, singly present line 5.3 has this resistance, then the temperature of interest can be determined from the electrical resistance of the first temperature sensor 1.

A second temperature sensor 2 serves, for example, for the redundant measurement, or monitoring, of the temperature. It can, in another embodiment, also measure and/or monitor a second temperature. The second temperature sensor 2 is connected to the measurement transmitter 3 via two lines 5.4 and 5.5. In such case, a line 5.4 is connected to the same terminal 4.3 as one of the three lines 5.1, 5.2, 5.3, in the case shown here, line 5.3. The second line 5.5 is connected to the fourth terminal 4.4. In this way, five lines 5.1, 5.2, 5.3, 5.4 and 5.5 can be connected to only four terminals 4.1, 4.2, 4.3, 4.4. For the accurate measurement of temperature via the second temperature sensor 2, it is assumed, that also the two lines 5.4 and 5.5 have the same resistance as the first three lines 5.1, 5.2, 5.3. Therefore, it is sufficient to determine the electrical resistance of only one line and to apply this value for all lines. Alternatively, the five lines have another, however known, resistance relationship. The assumption, that all applied lines 5.1, 5.2, 5.3, 5.4 and 5.5 have the same electrical resistance and the same behavior of resistance, especially as a function of temperature, can be implemented by having the lines be of the same material and essentially of equal length (the lines of FIG. 1 do not show this equality, due to the schematic nature of the drawing). Additionally, it must be assured, that essentially the same temperature acts on the lines 5.1, 5.2, 5.3, 5.4 and 5.5, i.e. the lines 5.1, 5.2, 5.3, 5.4 and 5.5 are located, for example, in the same area, e.g. alongside one another in the same measuring tube. For putting the connection of the invention into practice, the measurement transmitter 3 or an evaluating unit connected therewith is embodied in such a manner that it determines via the first temperature sensor 1 the value of the electrical resistance, which is then used for all lines 5.1, 5.2, 5.3, 5.4 and 5.5. In a further embodiment, the resistance values of the five lines 5.1, 5.2, 5.3, 5.4 and 5.5 have, in each case, known interrelationships. The above case is the simplest configuration, in which the resistance values are equal to one another. With relationships deviating therefrom, but known, the resistance values of the lines can, however, in accordance with the invention, also be determined.

Figure 2:
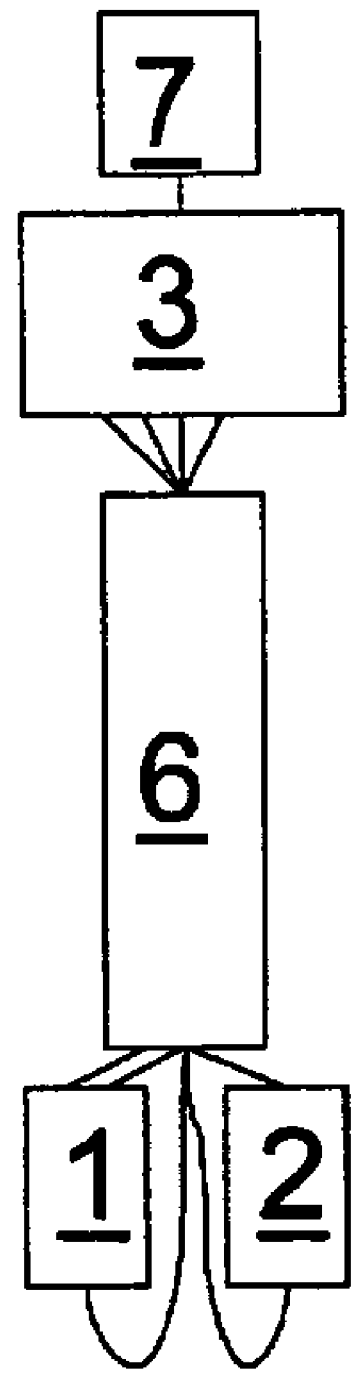
FIG. 2 is a further schematic drawing of the apparatus of the invention.

In FIG. 2, the electric lines are arranged in a protective tube 6. Within the protective tube 6, it is, in such case, preferably assured that the individual lines are always exposed to the same temperature, i.e. the lines are situated as close as possible to one another. The microprocessor 7, which, in an embodiment, is a component of the measurement transmitter 3, controls the individual terminals, or, in other words, the signals applied by the measurement transmitter 3 to the terminals and, thus, to the lines. The microprocessor 7 thus measures the electrical resistances of the temperature sensors 1 and 2, starting from the electrical resistance which has been determined for the electric lines. Microprocessor 7 and/or the measurement transmitter 3 are advantageously embodied in such a manner that the connecting of the invention for measurement transmitter 3 can be suitably changed, for example via a programming interface, e.g. a DIP switch, a digital interface or a service unit, for the purpose of evaluating the measurement signal. I.e., for example via a DIP switch, choice can be made between a connecting according to the state of the art and the connecting of the invention with at least two temperature sensors, in which the resistance value determined for the lines of one sensor is used also for the other sensor.

The configuration of a temperature transmitter is effected usually via a HART/Profibus PA, or Fieldbus Foundation (FF) protocol (modulated on the power supply line) or via a serial connection to a PC (FS232 or USB interface).

The invention claimed is:

1. An apparatus for determining and/or monitoring at least one temperature, comprising:
at least a first temperature sensor and a second temperature sensor;
at least five electric lines; and
at least one measurement transmitter, said at least one measurement transmitter has at least four terminals for electrical connection of said at least five electric lines to said measurement transmitter, wherein:
said first temperature sensor is connected to at least three terminals of said at least four terminals of said measurement transmitter via at least three electric lines of said at least five electric lines;
said at least three electric lines are connected with said first temperature sensor and with said measurement transmitter in such a manner that, via a 3-line circuit, a value of electrical resistance of at least one of said at least three electric lines can be obtained;
said second temperature sensor is connected with at least two terminals of said at least four terminals of said measurement transmitter via at least two electric lines of said at least five electric lines; and
the value of electrical resistance of at least one electric line of said at least five electric lines obtained via said 3-line circuit serves for determining electrical resistance of at least one electric line of said at least five electric lines, via which said second temperature sensor is connected with said measurement transmitter.

2. The apparatus as claimed in claim 1, further comprising:
at least one microprocessor for controlling said at least four terminals and/or for evaluating and/or monitoring the at least one temperature via said first temperature sensor and/or said second temperature sensor (2).

3. The apparatus as claimed in claim 2, wherein:
said microprocessor is embodied in such a manner that it applies the value of the electrical resistance determined with said 3-line circuit for calculating the value of the electrical resistance of said at least two electric lines of said at least five electric lines, via which said second temperature sensor is connected with said measurement transmitter.

4. The apparatus as claimed in claim 1, wherein:
said at least five electric lines are arranged in such a manner that essentially the same temperature acts on them.

5. The apparatus as claimed in claim 1, wherein:
at least two of the electrical resistances of said at least five electric lines have a known relationship to one another.

6. The apparatus as claimed in claim 1, wherein:
the electrical resistances of said at least three electric lines of said first temperature sensor and electrical resistances of said at least two electric lines of said second temperature sensor have a known relationship to one another.

7. The apparatus as claimed in claim 5, wherein:
said at least five electric lines are embodied in such a way that they have essentially the same electrical resistance.

8. The apparatus as claimed in claim 1, wherein:
at least said first temperature sensor is a temperature measuring resistor.

9. The apparatus as claimed in claim 1,
at least one electric line of said at least three electric lines, via which said first temperature sensor is connected with said measurement transmitter, and at least one electric line of said at least two electric lines, via which said second temperature sensor is connected with said measurement transmitter, are connected with the same terminal of said measurement transmitter.

10. A method for determining and/or monitoring at least one temperature, wherein a temperature-dependent, electrical resistance of at least a first temperature sensor and a second temperature sensor is evaluated, and wherein the first temperature sensor and the second temperature sensor are connected with a measurement transmitter via electric lines, comprising the steps of:
  determining via the first temperature sensor, a value of electrical resistance of electric lines connected with the first temperature sensor; and
  applying the determined value of the electrical resistance for determining values of electrical resistance of electric lines connected with the second temperature sensor.

* * * * *